(12) United States Patent
Corsi

(10) Patent No.: US 7,561,994 B1
(45) Date of Patent: Jul. 14, 2009

(54) METHOD FOR A VIRTUAL PREGNANCY EXPERIENCE

(76) Inventor: Adam B. Corsi, 2532 Lake Flair Ct., Atlanta, GA (US) 30345

( * ) Notice: Subject to any disclaimer, the term of this patent is extended or adjusted under 35 U.S.C. 154(b) by 1775 days.

(21) Appl. No.: 09/894,631

(22) Filed: Jun. 28, 2001

Related U.S. Application Data

(60) Provisional application No. 60/214,918, filed on Jun. 29, 2000.

(51) Int. Cl.
*G06F 7/48* (2006.01)
(52) U.S. Cl. ............................................. 703/6; 703/22
(58) Field of Classification Search .................. 703/6, 703/11, 22; 434/262, 236; 705/10; 345/419, 345/706; 709/250; 463/37, 42; 446/268; 382/118; 358/1.15
See application file for complete search history.

(56) References Cited

U.S. PATENT DOCUMENTS

| | | | | |
|---|---|---|---|---|
| 5,207,728 | A * | 5/1993 | Fogarty et al. ................. 446/98 |
| 5,850,463 | A * | 12/1998 | Horii ............................ 382/118 |
| 6,012,926 | A * | 1/2000 | Hodges et al. ................ 434/236 |
| 6,126,548 | A * | 10/2000 | Jacobs et al. .................... 463/42 |
| 6,244,960 | B1 * | 6/2001 | Takasaka et al. ............... 463/37 |
| 6,329,986 | B1 * | 12/2001 | Cheng .......................... 345/419 |
| 6,396,509 | B1 * | 5/2002 | Cheng .......................... 345/706 |
| 6,494,762 | B1 * | 12/2002 | Bushmitch et al. ........... 446/268 |
| 6,509,896 | B1 * | 1/2003 | Saikawa et al. .............. 345/419 |
| 6,561,811 | B2 * | 5/2003 | Rapoza et al. ................ 434/236 |
| 6,625,661 | B1 * | 9/2003 | Baldwin, Jr. ................. 709/250 |
| 6,758,676 | B2 * | 7/2004 | Eggert et al. ................. 434/262 |
| 6,842,877 | B2 * | 1/2005 | Robarts et al. ............... 715/708 |
| 7,107,253 | B1 * | 9/2006 | Sumner et al. ................. 706/45 |
| 2001/0034639 | A1 * | 10/2001 | Jacoby et al. ................... 705/10 |
| 2002/0135794 | A1 * | 9/2002 | Rodriguez et al. .......... 358/1.15 |
| 2003/0073060 | A1 * | 4/2003 | Eggert et al. ................. 434/262 |
| 2005/0047684 | A1 * | 3/2005 | Baum et al. .................. 382/311 |

FOREIGN PATENT DOCUMENTS

| | | | |
|---|---|---|---|
| JP | 2000-067824 | * | 3/2000 |
| JP | 2000-067825 | * | 3/2000 |
| JP | 2000-067828 | * | 3/2000 |
| JP | 2000-077657 | * | 3/2000 |
| JP | 2000-077658 | * | 3/2000 |
| JP | 2000-117377 | * | 3/2000 |

OTHER PUBLICATIONS

LAU et al., T. Designing, Developing, and Implementing a Web-Based, Database-Driven Learning System: The SunTAN Experience, 1998 IEEE International professional Communication Conference, vol. 2, Sep. 1998, pp. 85-92.*

DEFANTI et al., T. Personal Tele-Immersion Device, The Seventh International Symposium on High Performance Distributed Computing, IEEE, Jul. 1998, pp. 198-205.*

(Continued)

*Primary Examiner*—Russell Frejd

(57) ABSTRACT

A system and method for delivering a virtual pregnancy experience over a computer network and creating a customized offspring based on traits of the virtual parents.

7 Claims, 7 Drawing Sheets

OTHER PUBLICATIONS

ZWERN, A. Virtual reality: State-of-the-Art and Key Challenges, WESCON/'95, Conference Record, IEEE, Microelectronics Communications Technologies, Nov. 1995, pp. 686-690.* eBunintheOven.com Goes Live!—e-Impregnation Service Offers a Virtual Pregnancy experience Along With a Customized Offspring!, Topica web page, DayTips.com Weekly Lists, StrangeNews, Dec. 2001.*

BabyCenter.com, Oct. 1999, pp. 1-6.*

Simpson, T. Creatures 2 Strategy Guide, CyberLife Technology Ltd., Copyright 1998.*

Wilson, C. Give birth . . . to a cyber baby, Birmingham Post, [City Edition], Dec. 21, 1999, p. 21.*

* cited by examiner

METHOD FOR A VIRTUAL PREGNANCY EXPERIENCE

CROSS REFERENCE TO RELATED APPLICATIONS

The present application claims priority to U.S. Provisional Application Ser. No. 60/214,918, filed Jun. 29, 2000, which is incorporated herein by reference.

BACKGROUND OF THE INVENTION

The pregnancy and birth experience is a powerful and life changing event that affects or touches almost everyone in American society at some point in time. While the majority of women who have not experienced this event yet are curious about the experience, they have few tools today to help them understand the experience other than self-help type guides such as books or static web pages.

With the recent acceptance of enabling technologies, such as computer automation, the Internet, and email, the present invention serves to offer a virtual pregnancy experience to consumers. Through the invention, one consumer can virtually impregnate a targeted individual, who will then experience a virtual pregnancy, including having a virtual birth.

While the majority of consumers may be women looking to experience a simulated pregnancy, the present invention is also open to novelty uses, such as people virtually impregnating others as a form of affection or a joke, and men being virtually impregnated.

SUMMARY OF THE INVENTION

The present invention resides in a delivery method to providing a consumer with a simulated pregnancy experience via a computer network and creating an offspring product that is generated from a combination of the parent's traits.

Briefly, and in general terms, the service works in the following manner. A consumer places an order via the web site, which virtually impregnates an individual chosen by the Consumer (Giver). The individual that is virtually impregnated, the Consumer (Recipient), then receives an email message informing them that they have been virtually impregnated and will be receiving the service that creates a virtual pregnancy experience. The Consumer (Recipient) then receives a series of emails, or other deliverables, at scheduled intervals over the period of the virtual gestation. The deliverables will contain information that updates them on their status during the virtual pregnancy, and allows them to enter information that creates stronger customization of the experience. For example, the Consumer (Recipient) can enter their initial weight and the site calculates how much weight they are gaining over the period of the virtual pregnancy, and they can name their offspring. At the end of the virtual pregnancy experience, the Consumer (Recipient) has a virtual birth that creates an offspring based on the inputted traits of the Consumer (Giver) and the Consumer (Recipient). The offspring, or picture of the offspring, is then transferred into a physical form or product such as a mug that is then shipped to the Consumer (Recipient).

The offspring is generated based on information produced by the Consumer (Giver) when ordering the service. This collected data includes specific physical traits of both the Consumer (Giver) and Consumer (Recipient), or parents, in order to create an offspring that is a mixture of one or both of the parent's traits.

Various alternate embodiments can exist to this basic scenario, including the following. The Consumer (Giver) could virtually impregnate themself. The service could be extended to allow Consumers (Givers) to virtually impregnate themselves with celebrities, or the traits of celebrities. The offspring could be a variety of other customized products, like a doll for example. A technology could be used to have Consumers (Giver) and (Recipient) to submit pictures, and then the pictures could be combined, or morphed, and then further manipulated to create an offspring. The Consumer (Giver) can be copied (cc:ed) on all or partial deliverables, and may have the option to purchase an additional offspring. Information utilized to generate an offspring could be extended to include additional physical traits, personality traits, or other traits. The birth of multiple offspring could occur.

DESCRIPTION OF THE PREFERRED EMBODIMENT

Figure 1:
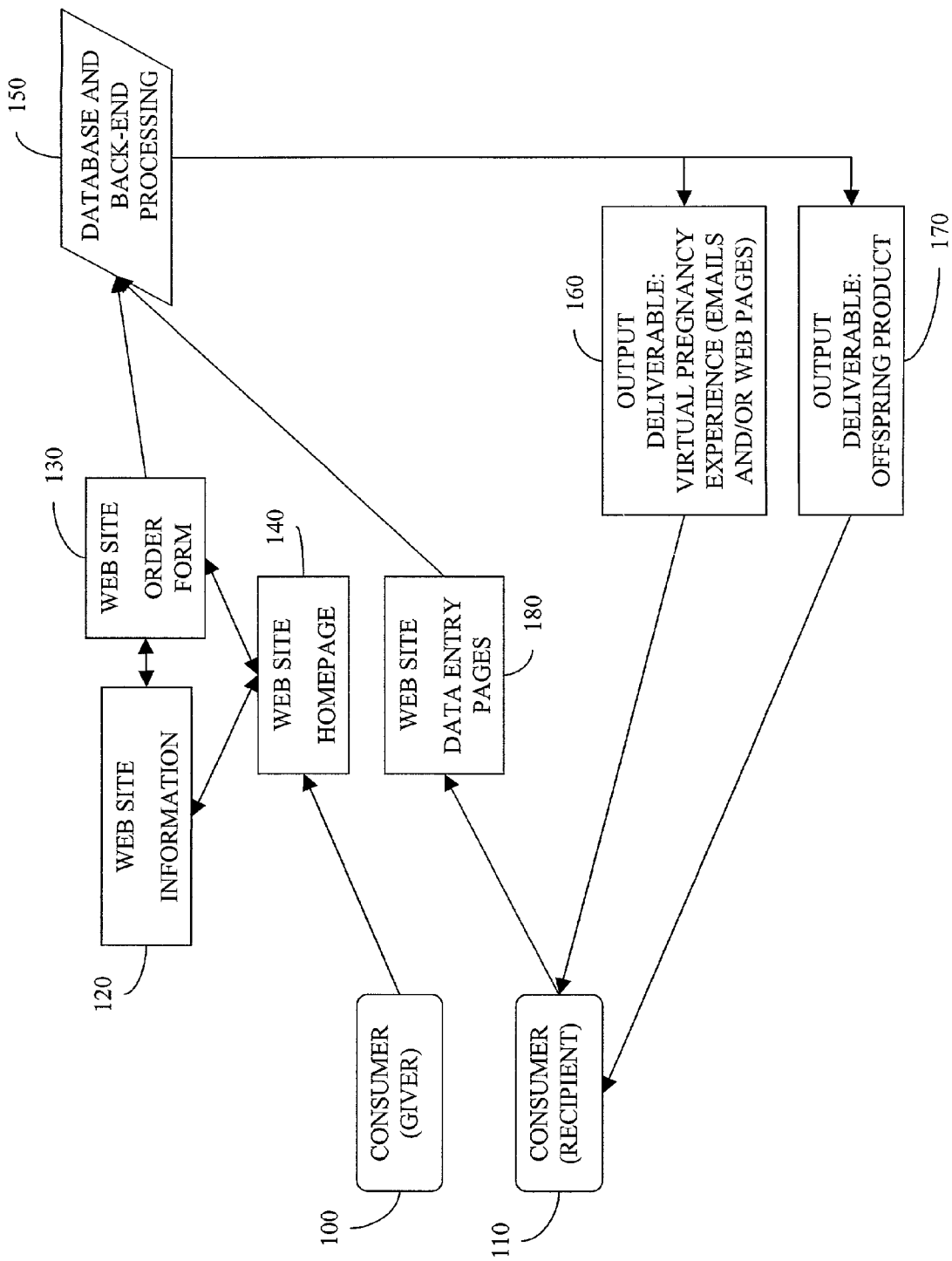
FIG. 1 is an overall process block diagram of the invention.

As shown in the drawings for purposes of illustration, the present invention pertains to a system for the delivery of a virtual pregnancy experience via a computer network and the generation of a virtual offspring.

FIG. 1 provides an overview of the invention through a process block diagram. The Consumer (Giver) (100) visits the company web site through a computer connected to the Internet. The web site home page (140) provides a brief overview of the service and product and contains link to other web pages that contain additional and more detailed information content. The web site information (120) consists of a variety of web pages that allow the Consumer (Giver) to easily navigate in order to find information about the company, product, how the service works, and answers to anticipated questions. When a Consumer (Giver) decides to purchase the service, the individual visits the order form web page (130). The Consumer (Giver) is required to fill out information and submit the order for processing. This process is explained in more detail through FIG. 3 and the associated description. Once an order is submitted, the data is captured and processed (150). Briefly, data is captured and stored in a database, and processed through a series of programming scripts. The process enables the automation of multiple email processing and customization based on Consumer (Giver) and Consumer (Recipient) provided data. This back-end processing utilizes current technologies, and is explained in more detail in FIG. 4 and the associated description. The primary outputs of the service will be a series of deliverables, which in the majority of cases will be emails, to the Consumer (Recipient). The deliverables (160) will be utilized to provide the virtual pregnancy experience by updating the Consumer (Recipient) (110) with a status report on their virtual pregnancy over the duration of the experience. The emails will be sent periodically over the duration of the virtual pregnancy, which will cease with the virtual birth. For more information on the Deliverables and the virtual pregnancy experience, please refer to FIGS. 2 and 6 and the associated description. The Consumer (Recipient) receives the first deliverable, usually in the form of an email, to inform them that they have been virtually impregnated and then periodically receive the update emails to provide them of the status of their virtual pregnancy. The Consumer (Recipient) will be prompted at certain intervals to provide data that enables customization of the service and product. The Consumer (Recipient) will be informed via the deliverables that contain a link to a web page that prompts the individual for data (180). The data is then submitted and stored in the database for processing and enables further customization. The final output of the process, in association with the virtual birth is a customized product of the offspring (170). The characteristics of the offspring will be generated via an algorithm based on the data of the parent's traits and then the information will be utilized to generate an offspring. The offspring's picture will then be transferred to a physical product and sent to the Consumer (Recipient). For a more detailed description of the offspring generation, refer to FIG. 5 and the associated description.

Figure 2:
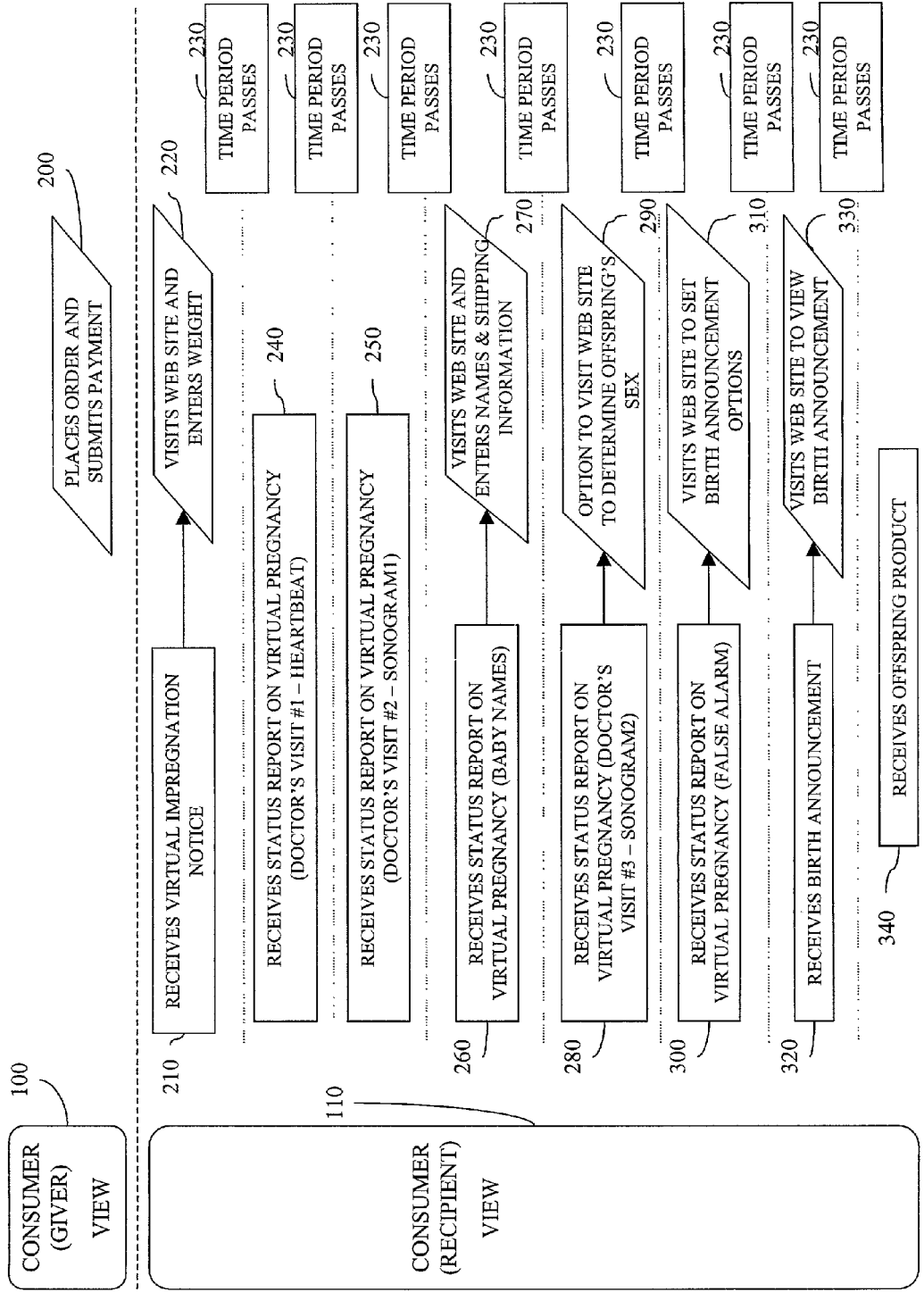
FIG. 2 is a block diagram of the process from a customer-centric perspective.

FIG. 2 offers a customer-centric perspective of the present invention. The Consumer (Giver)'s view (100) is limited to ordering of the service and receiving an order confirmation email (200), unless the Consumer (Recipient) chooses to copy (cc:) the individual on the output deliverables. In rare cases the Consumer (Giver) and the Consumer (Recipient) could be the same individual, conducting a virtual self-impregnation. The Consumer (Recipient)'s view (110) is the primary channel for the virtual pregnancy experience. Initially, the Consumer (Recipient) receives an email notice informing them of their virtual impregnation (210) and the identity of the Consumer (Giver). The notice explains the service, and contains a link for the Consumer (Recipient) to enter the web site and enter data on their current weight (220). This enables customization of the Consumer (Recipient)'s virtual pregnancy. A period of time passes (230) between each deliverable in order to increase the waiting time in order to simulate the anticipation of deliverables and the eventual virtual birth. Initially this time period duration will be two weeks between deliverables, simulating a virtual gestation period of three months. However, these time periods may change. As the time period pass, the Consumer (Recipient) will receive deliverables updating their virtual pregnancy status. Currently planned deliverables include virtual experiences of: A first doctor's visit where they can hear the offspring's heartbeat (240), a second doctor's visit where they can see the offspring on a sonogram (250), a time when they need to choose offspring names (260), a third doctor's visit with a second sonogram (280), a trip to the hospital on a false alarm (300), and the birth announcement (320). The Consumer (Recipient) will also be provided links to web pages to enter data that enables further customization during the process. Currently planned data captured in the process includes: Offspring's name choices for boy and girl and shipping information for the final product (270), option to determine the offspring's sex (290) after the second sonogram, and the option to post a birth announcement on the web homepage and to send email birth notices (310). After the virtual birth, a picture of the generated offspring will be posted on the web site for the Consumer (Recipient) to visit (330) if the option was selected, and the offspring will be made into a physical product and sent to the Consumer (Recipient) (340). Initially, the offspring's picture will be burned onto a mug with the name provided by the Consumer (Recipient), however future products could vary. Alternate embodiments of potential physical products include dolls, a computer device or application, and products that an image can be placed on, including: clothing, a button, a picture, and a mousepad.

Figure 3:
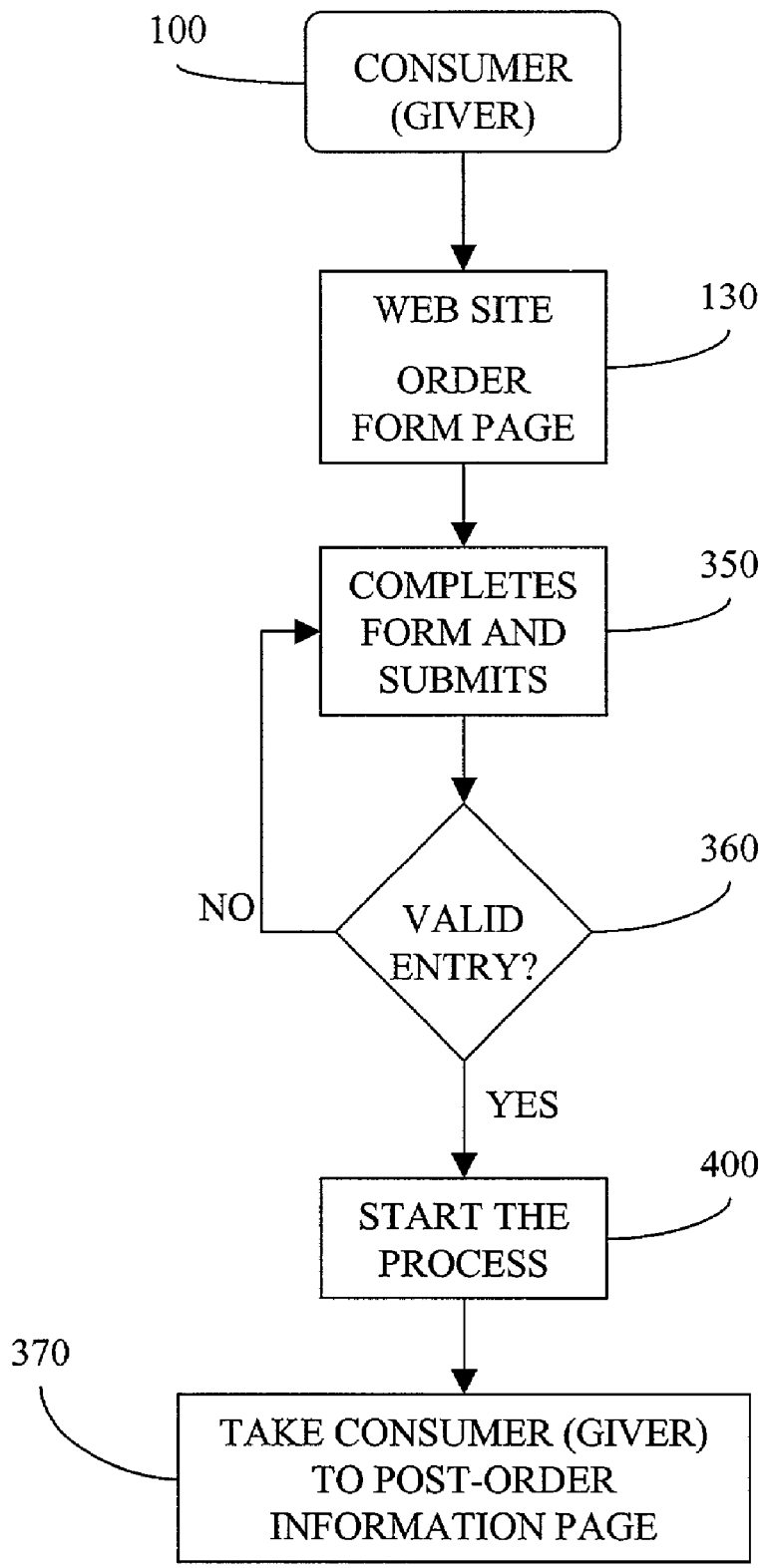
FIG. 3 is a flow diagram of the order process.

FIG. 3 provides a flow diagram of the order process. The Consumer (Giver) (100) connects to the web site order form page (130) to place an order. The Consumer (Giver) is then prompted for data needed for the processing with the form. Current requested information includes: Consumer (Giver)'s first name, last name, phone number, email address, credit card information, and traits, the Consumer (Recipient)'s first name, last name, email address, and traits. The traits initially will be physically based, collecting data on skin tone color, hair color, and eye color, although other traits such as personality types are alternate embodiments. After filling out the required data, the Consumer (Giver) submits the form (350), which is verified (360) to make sure all of the required fields are completed and appear to be valid. If the data is not valid, the form is resubmitted to the Consumer (Giver) with an error note for resubmission. If the data is valid, the form is then written to database and the back-end processing of the service begins (400). The Consumer (Giver) is then transported to a web page that provides them with post-order data (370).

Figure 4:
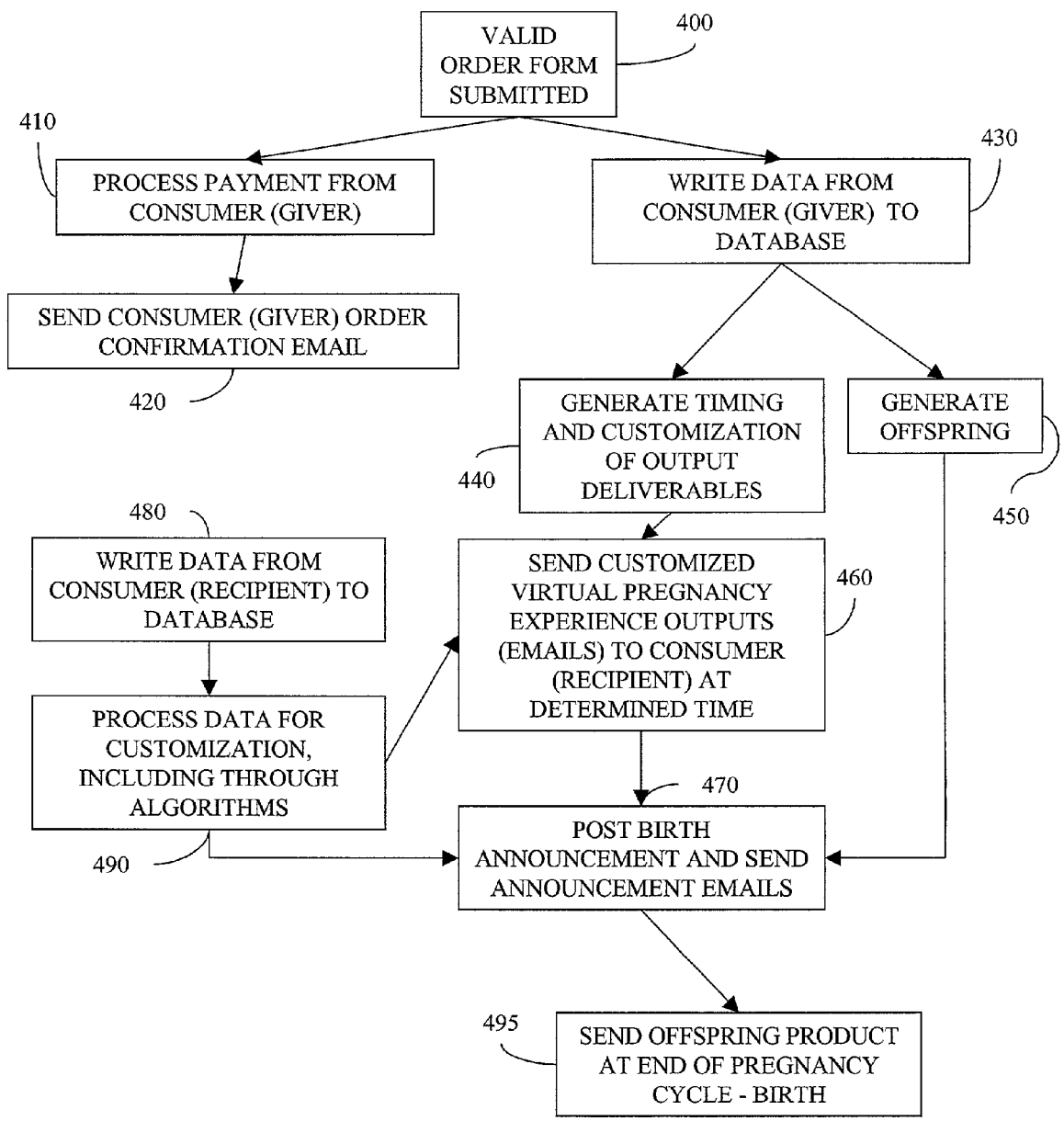
FIG. 4 is a simplified block diagram of the back-end processing used to generate customization and output deliverables.

FIG. 4 offers a simplified view of the back-end processing. Once a valid order form is submitted (400), the payment method is processed utilizing current payment processing technologies (410). Once authorization is received from the payment processor, the Consumer (Giver) is sent an order confirmation email (420) that serves as a payment receipt for the service. With submission of the order form, the collected data is written to a database (430) for storage. This data is then utilized to create customized data by running several programming scripts. In particular, the data is processed through scripts that generate the timing of when specific deliverables will be sent (440), customization to the Consumer (Recipient), and generation of the offspring (450) or offspring's traits. Programming scripts are also used to send the deliverables at the proper interval (460) and to write data generated from programming scripts or algorithms to the database. Data inputted by the Consumer (Recipient) is also written to the database (480), and can be run through algorithms embedded in programming scripts (490) to create further customization, such as calculating virtual weight gained by period during the virtual pregnancy. The back-end processing concludes as the virtual birth occurs, emails are sent and a birth announcement is posted (470). A final output of the current process is also a picture of the offspring (495) that can be made into or burned onto a physical product.

Figure 5:
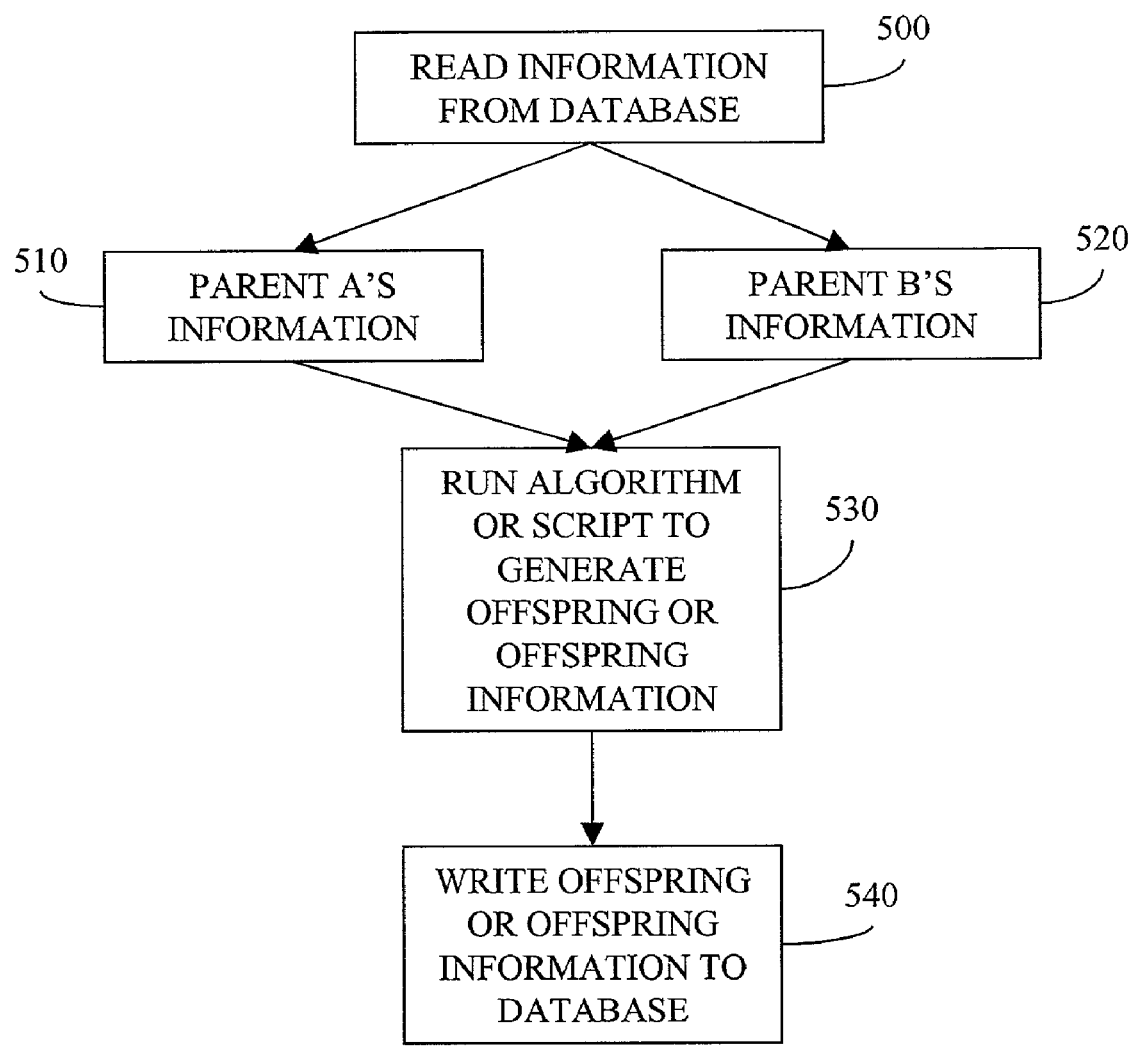
FIG. 5 is a block diagram of the offspring generation process.

FIG. 5 demonstrates the generation of an offspring through a block diagram. A programming script is prompted to read the data from the database (500) provided by the Consumer (Giver) in order to capture the trait information provided for both the Consumer (Giver) and the Consumer (Recipient), who are the virtual parents of the offspring-to-be (510) and (520). The data is then processed through an algorithm (530) via a programming script or another technology tool that creates a virtual offspring based on the traits of two individuals, such as picture morphing. The output should generate a picture of an offspring, or particular traits of the offspring that are based on a combination of one of or both of the parent's individual traits. The generated offspring or offspring's traits can then be written to the database (540) for future use in the process.

Figure 6:
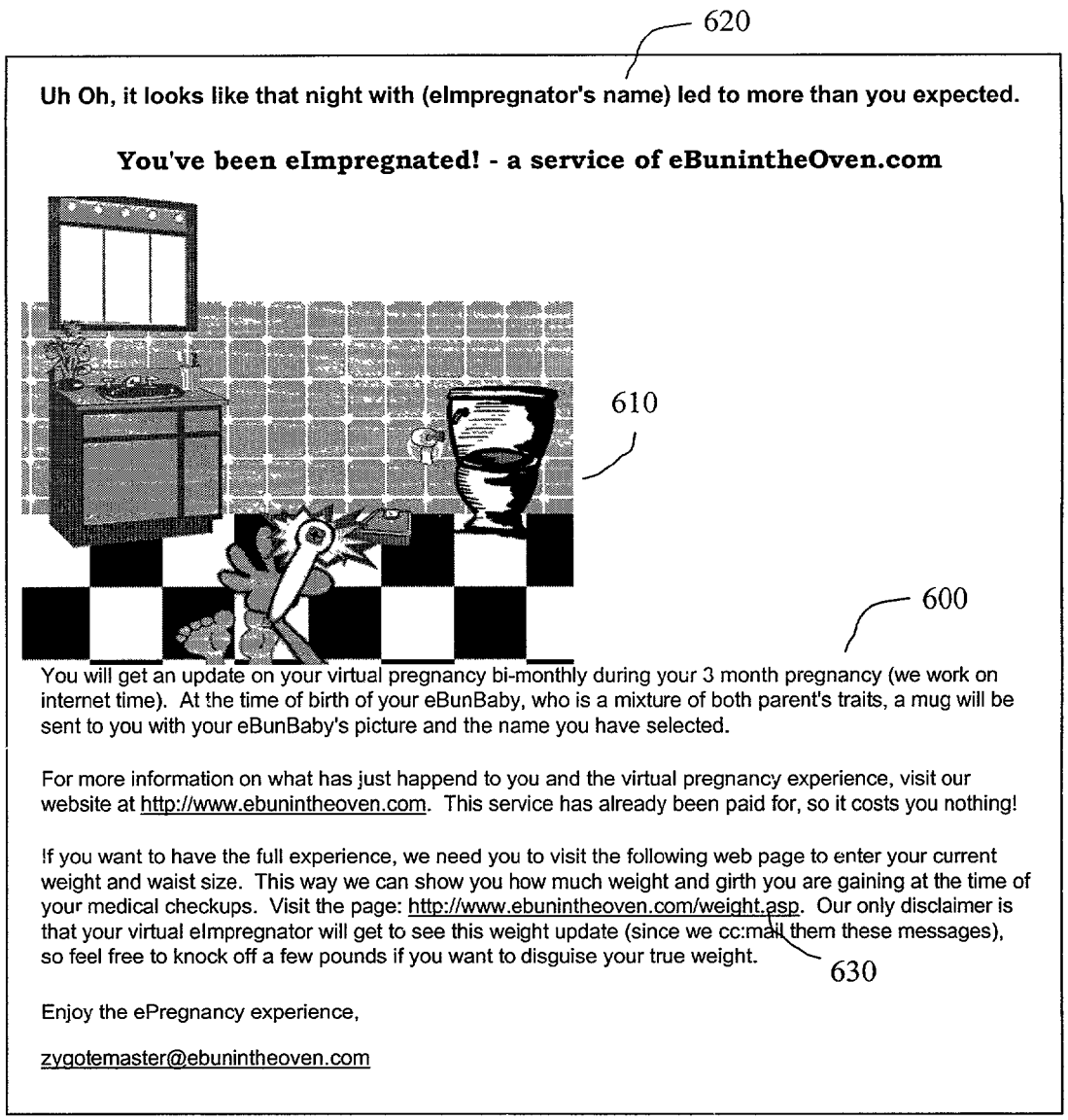
FIG. 6 is a picture of a sample output deliverable displaying sample product customization features.

FIG. 6 is a picture of a sample output deliverable, demonstrating product customization. The standard deliverable is in the form of an email that includes both a text (600) and a picture (610) component. While the primary deliverable will usually be in the form of emails, an alternate embodiment could utilize current web page technology for viewing of the deliverable if the user does not have supporting technology that allows them to fully view the content of the email. Forms of customization (620) are included to increase the Consumer (Recipient) experience. Associated links to web pages (630) that collect user data will be embedded in the deliverable and further enable the service customization. Actual pictures, text, customization, and links will vary with each deliverable as the Consumer (Recipient) progresses through the virtual pregnancy cycle.

Figure 7:
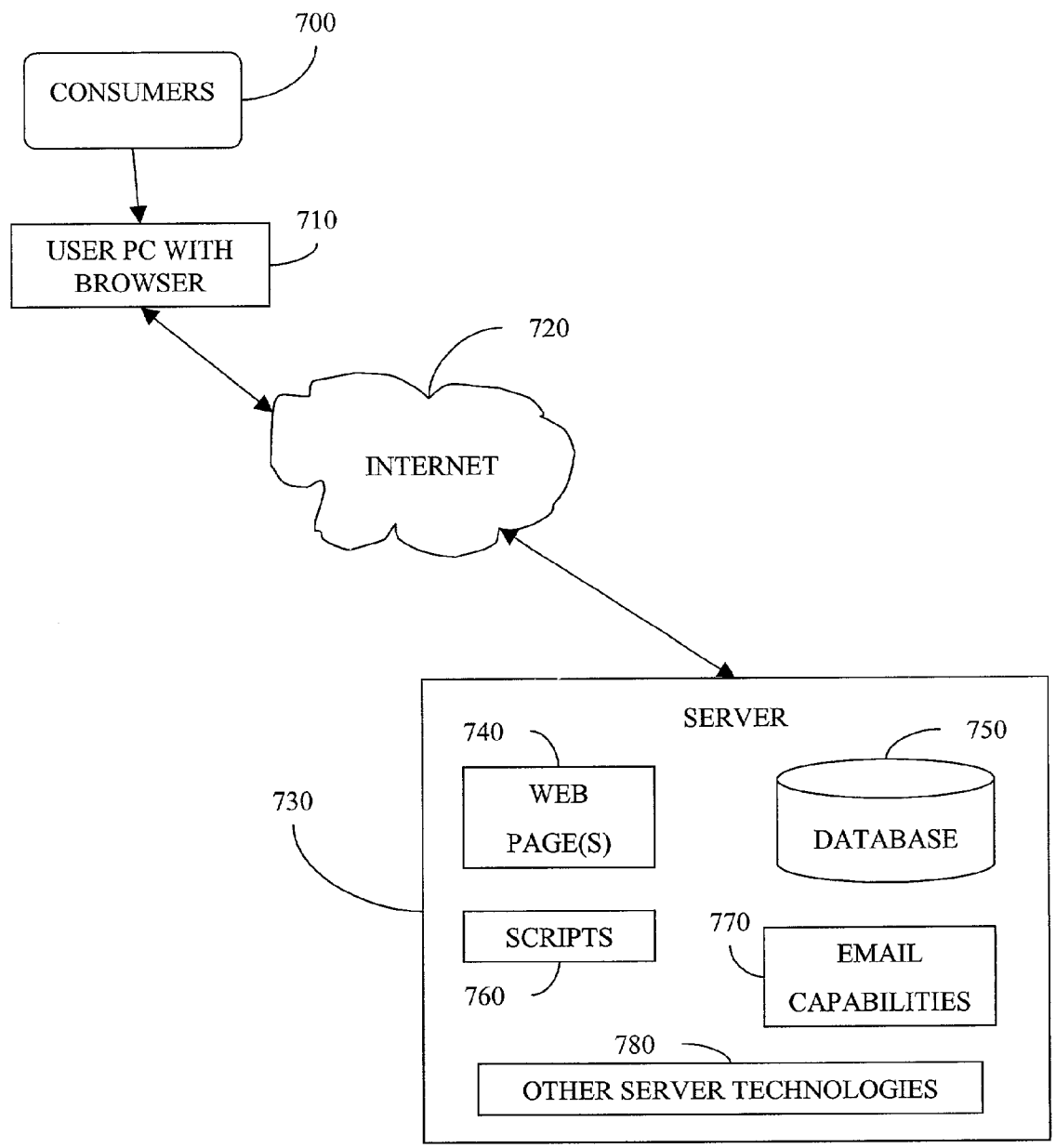
FIG. 7 is a block diagram demonstrating the technical elements required.

FIG. 7 provides an overview of some of the technical elements required for the invention. Consumers (700), both (Giver) and (Recipient), access the Internet (720) through a computer equipped (710) with a browser or comparable technology. The web pages (740), database (750), programming scripts (760), and associated files are located on a server (730) that is connected to the Internet. The server also houses current server technologies (780) that are being utilized today, such as capabilities to send multiple emails (770). This architecture is currently being utilized by numerous web-based businesses, and is only shown to be comprehensive.

It will also be appreciated that, although a limited number embodiments of the invention have been described in detail for purposes of illustration, various modifications may be made without departing from the spirit and scope of the invention. Accordingly, the invention should not be limited except as by the appended claims.

I claim:

1. A method for delivering a virtual pregnancy experience comprising:
    receiving an electronic request from a user for a targeted recipient to experience a virtual pregnancy experience of the targeted recipient via a computer device;
    notifying the targeted recipient that the targeted recipient is virtually impregnated;
    communicating status of the targeted recipient's virtual pregnancy via the computer device;
    providing the targeted recipient an electronically generated image of a virtual offspring resulting from the virtual pregnancy; and
    providing the image of a virtual offspring in a product selected from the group consisting of clothing, a mug, a picture, a computer display, a computer application, and a doll.

2. A method for delivering a virtual pregnancy experience comprising:
    receiving an electronic request from a user for a targeted recipient to experience a virtual pregnancy experience of the targeted recipient via a computer device;
    notifying the targeted recipient that the targeted recipient is virtually impregnated;
    communicating status of the targeted recipient's virtual pregnancy via the computer device;
    receiving data for at least one physical trait of the targeted recipient;
    providing the targeted recipient an electronically generated image of a virtual offspring resulting from the virtual pregnancy;
    generating by the computer device the image of the virtual offspring from the data for the at least one physical trait; and
    providing the image of a virtual offspring in a product selected from the group consisting of clothing, a mug, a picture, a computer display, a computer application, and a doll.

3. A method for delivering a virtual pregnancy experience comprising:
    receiving an electronic request from a user for a targeted recipient to experience a virtual pregnancy experience of the targeted recipient via a computer device;
    notifying the targeted recipient that the targeted recipient is virtually impregnated;
    communicating status of the targeted recipient's virtual pregnancy via the computer device;
    receiving data for at least one physical trait of a virtual parent, wherein the virtual parent is a celebrity;
    providing the targeted recipient an electronically generated image of a virtual offspring resulting from the virtual pregnancy;
    generating by the computer device the image of the virtual offspring from the data for the at least one physical trait of the virtual parent; and
    providing the image of a virtual offspring in a product selected from the group consisting of clothing, a mug, a picture, a computer display, a computer application, and a doll.

4. A method for delivering a virtual pregnancy experience comprising:
    receiving an electronic request from a user for a targeted recipient to experience a virtual pregnancy experience of the targeted recipient via a computer device;
    notifying the targeted recipient that the targeted recipient is virtually impregnated;
    communicating status of the targeted recipient's virtual pregnancy via the computer device;
    receiving data for at least one physical trait of a virtual parent;
    generating by the computer device the image of the virtual offspring from the data for the at least one physical trait of the virtual parent; and
    providing the providing the targeted recipient an electronically generated image of a virtual offspring resulting from the virtual pregnancy.

5. The method of claim 4, further comprising
    providing the image of a virtual offspring in a product selected from the group consisting of clothing, a mug, a picture, a computer display, a computer application, and a doll.

6. A method for delivering a virtual pregnancy experience comprising receiving an identity of a virtual parent to virtually impregnate via a computer device, sending an electronic message via the computer device informing the virtual parent that the virtual parent is virtually impregnated, communicating via the computer device virtual physical chances to the virtual parent occurring during virtual pregnancy, electronically generating by the computer device an image of a virtual offspring of the virtual parent resulting from virtual pregnancy and including the image in a product representing the virtual offspring.

7. The method of claim 6, wherein the product is selected from the group consisting of clothing, a mug, a picture, a computer display, a computer application, and a doll.

* * * * *